US006968413B2

(12) United States Patent
Cranford, Jr. et al.

(10) Patent No.: US 6,968,413 B2
(45) Date of Patent: Nov. 22, 2005

(54) METHOD AND SYSTEM FOR CONFIGURING TERMINATORS IN A SERIAL COMMUNICATION SYSTEM

(75) Inventors: Hayden C. Cranford, Jr., Apex, NC (US); Westerfield J. Ficken, Cary, NC (US); Paul A. Owczarski, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 10/266,132

(22) Filed: Oct. 7, 2002

(65) Prior Publication Data

US 2004/0068600 A1 Apr. 8, 2004

(51) Int. Cl.[7] .............................................. G06F 13/00
(52) U.S. Cl. ........................ 710/300; 710/58; 710/106; 710/301; 710/305
(58) Field of Search ................................ 710/300–304, 710/105–106, 305–315, 16, 11–12, 58–61

(56) References Cited

U.S. PATENT DOCUMENTS

| | | | | | |
|---|---|---|---|---|---|
| 4,052,566 | A | * | 10/1977 | MacKay | 370/458 |
| 4,052,567 | A | * | 10/1977 | MacKay | 370/458 |
| 4,637,011 | A | | 1/1987 | Crabbe, Jr. | |
| 4,697,858 | A | | 10/1987 | Balakrishnan | |
| 4,700,274 | A | | 10/1987 | Laut | |
| 5,280,551 | A | | 1/1994 | Bowen | |
| 5,359,714 | A | | 10/1994 | Avaneas | |
| 5,408,616 | A | | 4/1995 | Murr | |
| 5,455,917 | A | | 10/1995 | Holeman et al. | |
| 5,581,600 | A | | 12/1996 | Watts et al. | |
| 5,740,378 | A | | 4/1998 | Rehl et al. | |
| 5,781,747 | A | | 7/1998 | Smith et al. | |
| 5,884,053 | A | | 3/1999 | Clouser et al. | |
| 5,949,656 | A | | 9/1999 | Pinault | |
| 5,999,528 | A | | 12/1999 | Chow et al. | |
| 6,014,319 | A | | 1/2000 | Kuchta et al. | |
| 6,081,430 | A | | 6/2000 | La Rue | |
| 6,105,088 | A | | 8/2000 | Pascale et al. | |
| 6,128,201 | A | | 10/2000 | Brown et al. | |
| 6,556,038 | B2 | * | 4/2003 | Kim et al. | 326/30 |
| 2004/0078713 | A1 | * | 4/2004 | Yanagihara | 714/43 |

* cited by examiner

*Primary Examiner*—Paul R. Myers
*Assistant Examiner*—Raymond N Phan
(74) *Attorney, Agent, or Firm*—Sawyer Law Group LLP

(57) ABSTRACT

A system and method is disclosed that efficiently provides standard termination blocks in an approved cell library that are flexible and customizable. A serial communications system includes a transmitter for sending a serial data signal at an output of the transmitter; a transmitter terminator, coupled to the output and responsive to a first configuration signal, to variably terminate a first selected property of the output; a receiver for processing the serial data signal at an input of the receiver, the input of the receiver coupled to the output of the transmitter; and a receiver terminator, coupled to the input of the receiver and responsive to a second configuration signal to variably terminate a second selected properly of the input. The method for operating a serial communications system includes the steps of: (a) providing a plurality of unidirectional serial links, each of the links between a transmitter and a receiver, an output of each transmitter coupled to an input of a corresponding receiver by a medium type with each output having a transmitter terminator and each input having a receiver terminator; (b) terminating variably a selected property of the output of each transmitter to match the medium type coupling the output to the input of the corresponding receiver by use of a transmitter termination configuration signal asserted to the transmitter; and (c) terminating variably a selected property of the input of each receiver to match the medium type coupling the input to the output of the corresponding transmitter by use of a receiver termination configuration signal asserted to the receiver.

19 Claims, 4 Drawing Sheets

| ACDC_RX (hi = DC coupled configuration) | Powerup (high = link powered on) | DCPFET | ADPFET | ACNFET |
|---|---|---|---|---|
| 1 | 1 | 0 | 1 | 0 |
| 1 | 0 | 1 | 1 | 0 |
| 0 | 1 | 1 | 0 | 1 |
| 0 | 0 | 1 | 1 | 0 |

METHOD AND SYSTEM FOR CONFIGURING TERMINATORS IN A SERIAL COMMUNICATION SYSTEM

FIELD OF THE INVENTION

The present invention relates generally to terminating transmitters and receivers in data transmission systems, and more specifically to implementing and controlling configurable termination circuitry used in standardized modular transmission channel circuits.

BACKGROUND OF THE INVENTION

Although termination of a data transmission channel (a link between a transmitter and a receiver) is well known, typically termination issues are resolved on a circuit-by-circuit basis and can require use of an engineer or designer to customize the termination of each channel. For systems that use few transmission channels, the overhead for use of the engineer or designer is not prohibitive, but systems are being developed that use large numbers of channels.

There are many types of systems that may use large numbers of transmission channels. FIG. 1 is a schematic block diagram of one representative system having many transmission channels. FIG. 1 includes a system 100 having a first application-specific integrated circuit (ASIC) module 105, a second ASIC module 110, and one or more physical connection links 1115. Each ASIC module may include one or more transmitters/drivers 120 and receivers 125. Each link 115 between a driver 120 and a receiver 125 extends through one or more connectors 130. Each link 115 is formed from a particular medium. There are many different types of media that may be used depending upon the particular application, with connectors 130 appropriate for the particular medium.

As shown in FIG. 1, two different representative mediums are illustrated: a backplane medium 135 and a cable medium 140. In the construction of system 100, it is known to use a backplane medium 135 and cable medium 140 for communicating ASIC modules together. The media may communicate different types of signals, the most common being differential or common-mode signals, and each link 115 may be AC-coupled or DC-coupled depending upon design considerations. There are many different standards for interconnecting drivers 120 and receivers 125, and for terminating the link between them, that may be applicable to one or more links 115, depending upon signal type, medium, coupling, and other well-known factors.

ASIC module 105 and ASIC module 110 are typically configured using standard circuit configurations from an approved cell library. Customers may include custom circuitry in front of drivers 120 and after receivers 125, which means that the driver/link/receiver channel should be adaptable and flexible. As the number of ASICS increases, and the number of drivers on each ASIC increases, it becomes prohibitive to custom design and implement proper termination for each link 115.

Accordingly, what is needed is a system and method for efficiently providing standard termination blocks in an approved cell library that are flexible and customizable. The present invention addresses such a need.

SUMMARY OF THE INVENTION

A system and method is disclosed that efficiently provides standard termination blocks in an approved cell library that are flexible and customizable. A serial communications system includes a transmitter for sending a serial data signal at an output of the transmitter; a transmitter terminator, coupled to the output and responsive to a first configuration signal, to variably terminate a first selected property of the output; a receiver for processing the serial data signal at an input of the receiver, the input of the receiver coupled to the output of the transmitter; and a receiver terminator, coupled to the input of the receiver and responsive to a second configuration signal to variably terminate a second selected property of the input. The method for operating a serial communications system includes the steps of: (a) providing a plurality of unidirectional serial links, each of the links between a transmitter and a receiver, an output of each transmitter coupled to an input of a corresponding receiver by a medium type with each output having a transmitter terminator and each input having a receiver terminator; (b) terminating variably a selected property of the output of each transmitter to match the medium type coupling the output to the input of the corresponding receiver by use of a transmitter termination configuration signal asserted to the transmitter; and (c) terminating variably a selected property of the input of each receiver to match the medium type coupling the input to the output of the corresponding transmitter by use of a receiver termination configuration signal asserted to the receiver.

The invention efficiently provides flexible and customizable terminators coupled to the transmitters and receivers that may be standardized and implemented as part of a standard cell library and therefore do not require significant resources to design or implement. In the preferred embodiment, the terminators are configured under logic control.

DETAILED DESCRIPTION

The present invention relates to efficiently providing standard termination blocks in an approved cell library that are flexible and customizable. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
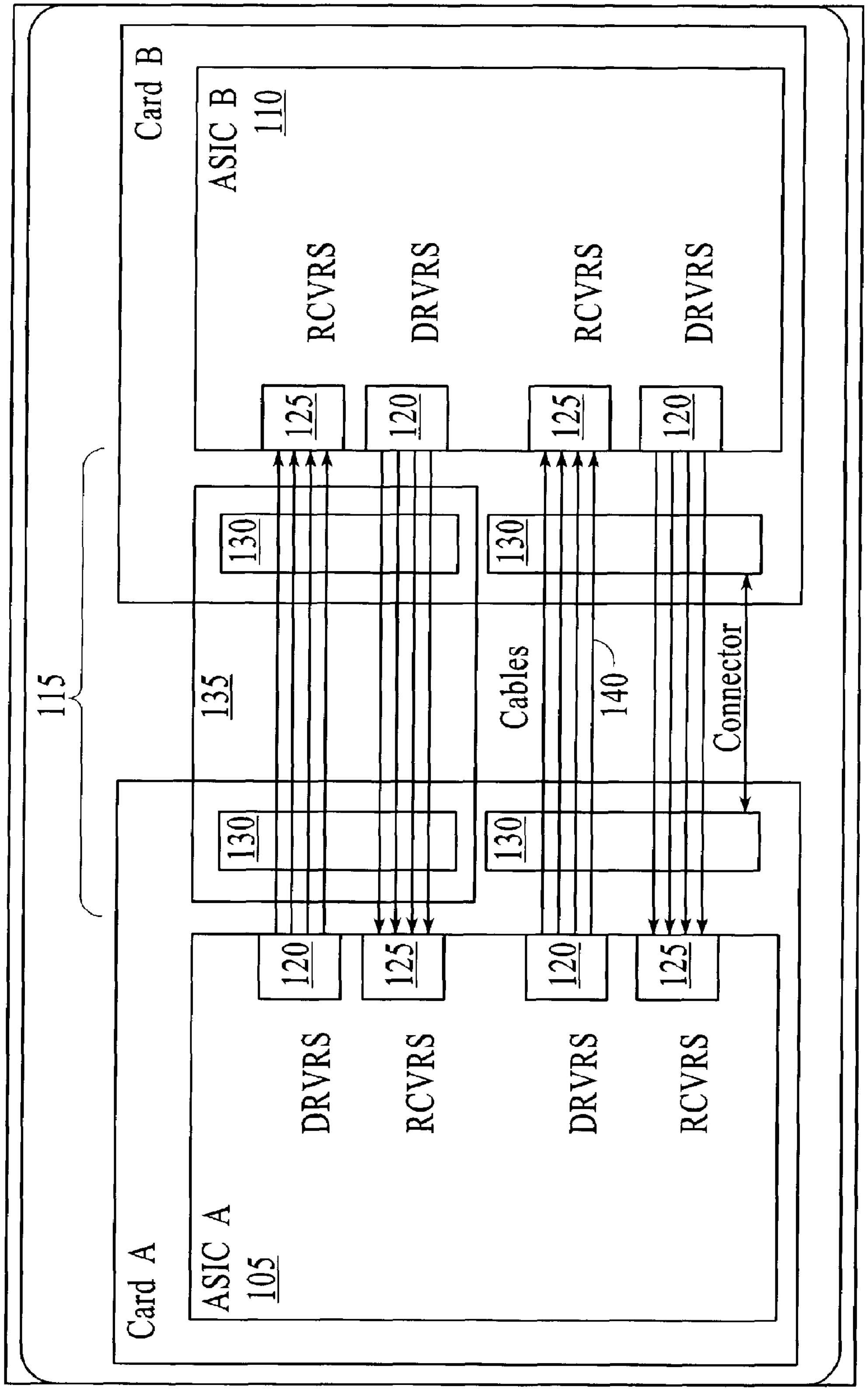
FIG. 1 is a schematic block diagram of one representative system having many transmission channels.
Figure 2:
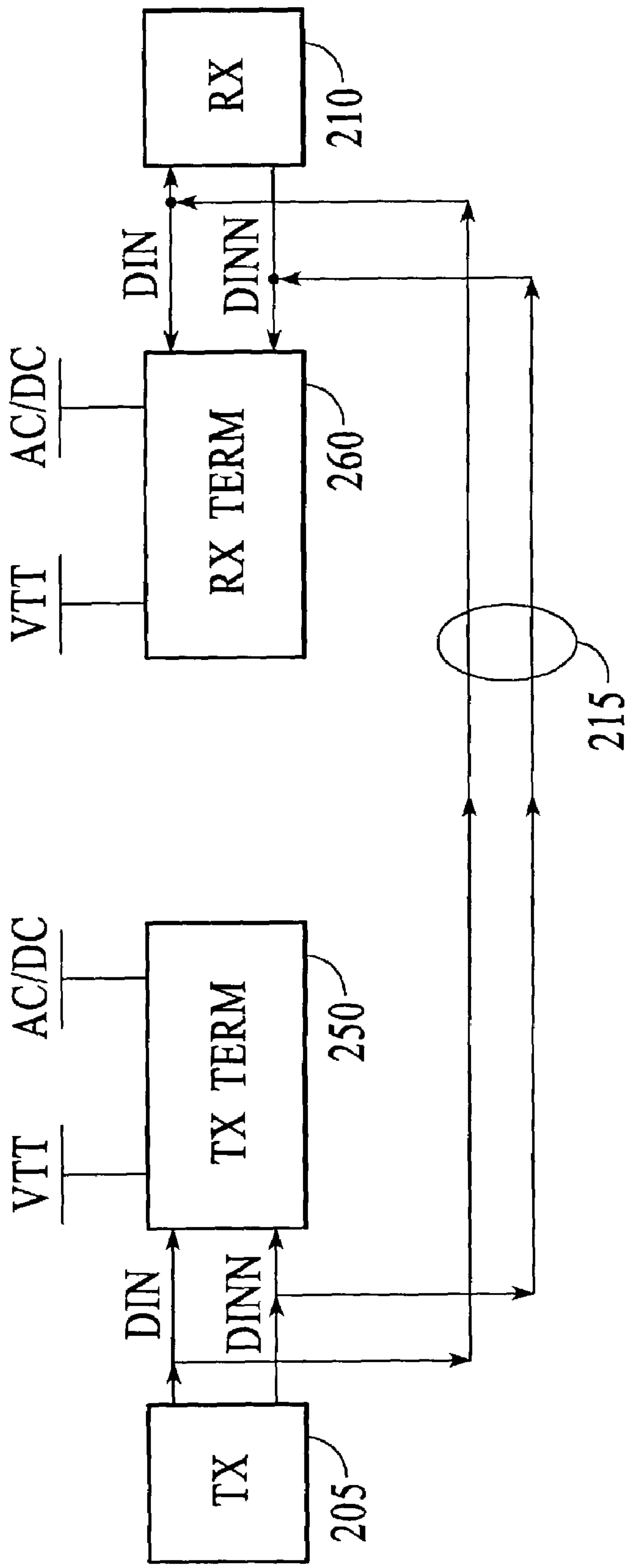
FIG. 2 is a schematic block diagram of a preferred embodiment of the present invention.

FIG. 2 is a schematic block diagram of a preferred embodiment of the present invention of a data communications system 200. System 200 includes a transmitter/driver 205 having an output coupled to an input of a receiver 210 by a link 215. Transmitter 205 is preferably a differential driver so link 215 includes two data paths from the output to the input for communicating two signals: DATA IN (DIN) and NOT DATA IN (DINN). A transmitter terminator 250 is coupled to the output of transmitter 205 and a receiver terminator 260 is coupled to the input of receiver 210.

Terminator 250 and terminator 260 are both individually configurable under logic control to variably terminate one or more selected properties of the output and input (respectively). The selected properly is dependent upon several factors and the specific embodiment and application including the link type and medium, but may include an AC/DC coupling mode, a termination voltage specific to the terminator, and a current sourcing mode of the terminator. Other properties may be variably terminated depending upon needs and design specification, as well as requirements for any applicable standards that link 215 must satisfy.

In the preferred embodiment, an AC/DC coupling mode as well as current sourcing mode are variably terminated in response to a configuration signal (AC/DC control). Termination voltage for each terminator is provided independent from supply voltage and is provided as VTT (RX_VTT and TX_VTT, with each able to be independently established for each terminator), though strictly speaking the VTT is not set in response to the configuration signal in the preferred embodiment. In some applications it may be desirable to provide for logic control of the termination voltage. Link 215 may be implemented having capacitors inline, which will block direct current and possibly interfere with communication of the transmitted signals DIN and DINN unless link 215 is properly terminated. When AC coupling is implemented for link 215, AC/DC control is asserted to configure terminator 250 and terminator 260 to be in AC mode. In this mode, current is sourced from both terminator 250 and terminator 260. When DC coupling is implemented for link 215, AC/DC control is asserted to configure terminator 250 and terminator 260 for the desired DC coupling termination. For DC coupling, current may be sourced from either end of link 215 depending upon the design considerations and applicable standards for the embodiment; the preferred embodiment sourcing current from terminator 260 in DC mode. In some standards, current is sourced from both ends with a DC coupling mode. In FIG. 2, the control signal AC/DC is shown for both transmitter 205 and receiver 210. However, it is understood that the AC/DC signal for transmitter terminator 250 may be the same as or different than the AC/DC signal for receiver terminator 260. In addition, the preferred embodiment provides for the possibility of providing a different termination voltage (VTT) for each transmitter terminator 250 and receiver terminator 260, with the VTT voltage level able to be different from the power supply voltage VDD as needed for a particular application.

Figure 3:
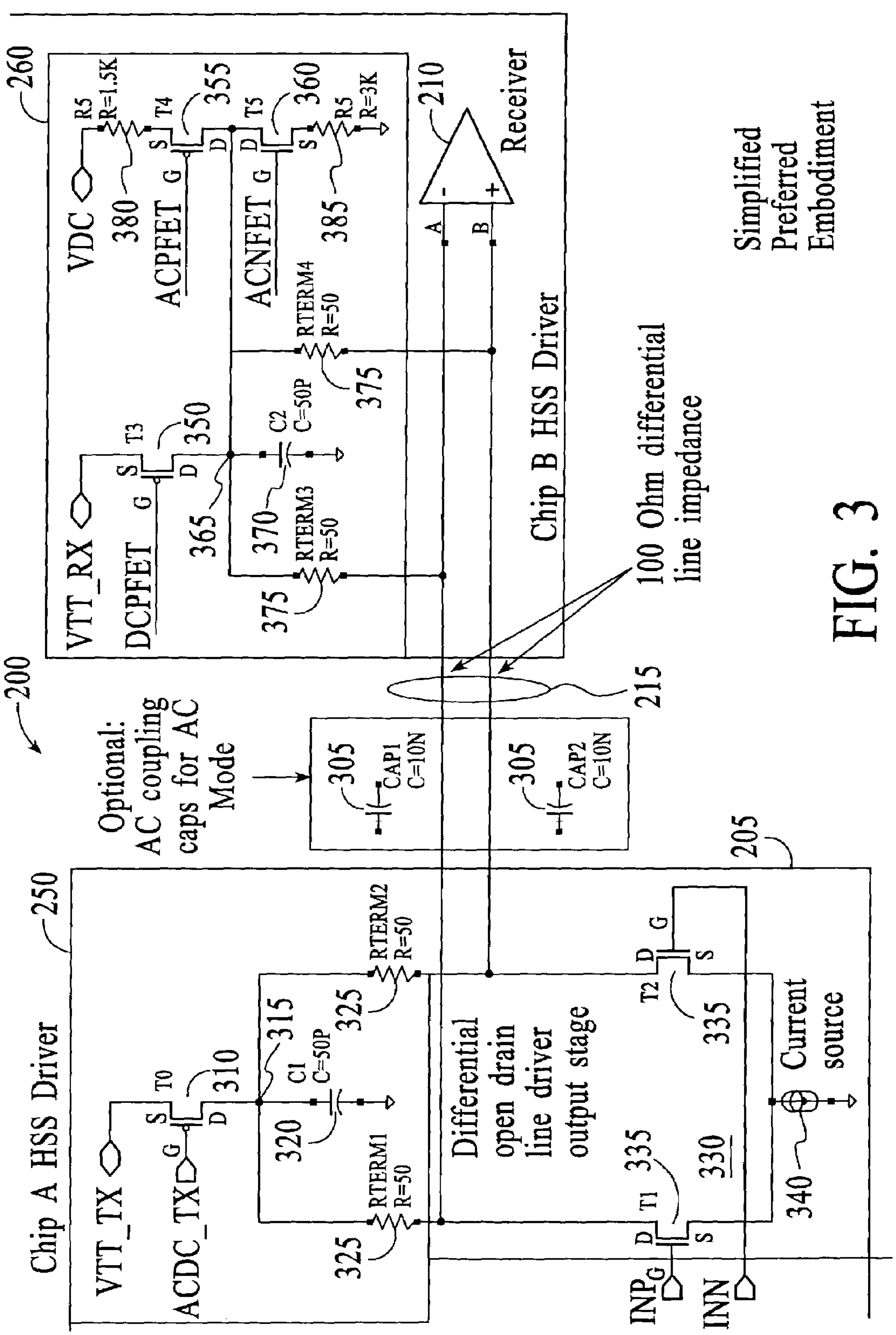
FIG. 3 is a detailed schematic diagram of a preferred embodiment of the present invention.

FIG. 3 is a detailed schematic diagram of a preferred embodiment of the present invention detailing an embodiment of the terminators used in communications system 200 shown in FIG. 2. As discussed above, link 215 may include AC coupling capacitors 305 to AC couple the output of transmitter 205 to the input of receiver 210. Terminator 250 and terminator 260 are configurable to adapt to link 215 including either AC coupling with capacitors 305 or DC coupling without capacitors 305. As discussed above, in AC coupling mode, current needs to be sourced at both terminator 250 and terminator 260. In DC coupling, current may be sourced at either terminator or both.

Transmitter terminator 250 includes a metal oxide semiconductor field effect transistor (MOSFET) 310 having a source coupled to transmitter VTT (VTT_TX), a drain coupled to a node 315, and a gate coupled to a logic control signal ACDC_TX. Also coupled to node 315 is one plate of a capacitor 320 having another plate coupled to ground. A pair of termination resistors 325 couple node 315 to DIN and DINN respectively and provide the termination resistance for transmitter terminator 250. In operation, the AC or DC coupling mode of transmitter terminator 250 is controlled by assertion or deassertion of ACDC_TX. As configured with MOSFET 310 implemented using a pFET, ACDC_TX is asserted hi for DC mode, and deasserted lo for AC mode. MOSFET 310 is configured as a switch and is off for DC mode and on for AC mode, with the result that current for system 200 is sourced through MOSFET 310 in AC mode and through receiver terminator 260 in DC mode. As explained above, in some applications the operation of terminator 250 may be changed to control current sourcing in a different fashion from the preferred embodiment depending upon the particular application.

Transmitter 205 includes a differential open drain line driver output stage 330 including a pair of MOSFETS 335 (nFETs) having their sources coupled to a current source 340, their drains coupled respectively to termination resistors 325 and their gates coupled to the input differential signal DIN and DINN. Output stage 330 always sinks current for link 215.

Receiver terminator 260 includes a trio of MOSFETS: a DC mode MOSFET 350 (pFET), and a pair of AC mode MOSFETS, a first AC mode MOSFET 355 (pFET) and a second AC mode MOSFET 360 (nFET) with the AC mode MOSFETS having their drains coupled together. DC mode MOSFET 350 has a source coupled to receiver VTT (VTT_RX), a drain coupled to a node 365, and a gate coupled to a logic control signal DCPFET. Also coupled to node 365 is one plate of a capacitor 370 having another plate coupled to ground. A pair of termination resistors 375 couple node 365 to DIN and DINN respectively and provide the termination resistance for receiver terminator 260. Node 365 is also coupled to the drains of the AC mode MOSFETS. A source of MOSFET 355 is coupled to VDD through a resistor 380 and a source of MOSFET 360 is coupled to ground through a resistor 385.

A first AC mode control signal (ACPFET) is coupled to a gate of MOSFET 355 and a second AC mode control signal (ACNFET) is coupled to a gate of MOSFET 360. Receiver terminator 260 control signals DCPFET, ACPFET and ACNFET are derived, in the preferred embodiment, from combinatorial logic applied to a master AC/DC mode control for the receiver (ACDC_RX).

Figure 4:
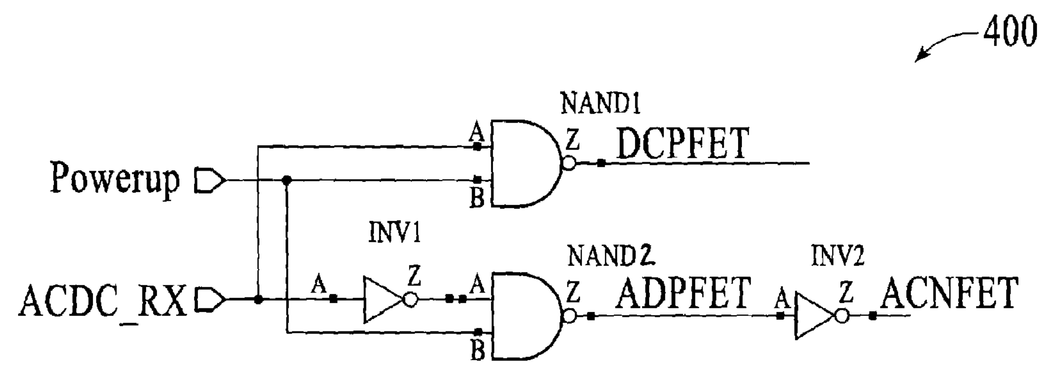
FIG. 4 is a logical schematic diagram of a truth table and a set of combinatorial logic gates to create the control signals used in the receiver terminator as specified by the truth table.

FIG. 4 is a logical schematic diagram of a truth table and set of combinatorial logic gates to create the control signals used in the receiver terminator and as specified in the truth table. Specifically, a truth table 400 illustrating the configurations of the control signals for various operational modes is implemented by the logic gates: two inverters and two dual-input NAND gates. The truth table implements a second feature of the preferred embodiment which is a power-saving mode. In some cases, it may be desirable to disable power to receiver 210, so receiver terminator 260 should also be turned off. Truth table 400 sets forth the logic states for the control signals based upon the value of ACDC_RX when this control signal is asserted hi for DC mode and asserted lo for AC mode. Additionally, a POWERUP control is provided: receiver terminator 260 is powered on when POWERUP is asserted hi.

The corresponding logic gates have a first NAND gate control the DC mode MOSFET 350 simply based upon the inverted logical product value of ACDC_RX and POWERUP (DCPFET is the signal from the first NAND gate with ACDC_RX and POWERUP applied to the inputs). The AC mode MOSFETS are controlled by the outputs of the remaining logic gates. The second NAND gate asserts the ACPFET control signal based upon the inverted logical product value of POWERUP and an inverted ACDC_RX signal output from the first inverter. The ACNFET control signal is the inverted value of the ACPFET control signal asserted from the second inverter coupled to an output of the second NAND gate.

In operation, when DC coupling mode is commanded for receiver terminator 260, ACDC_RX is asserted hi which results in turning on DC mode MOSFET 350 and turning off both the AC mode MOSFETS. In DC coupling mode, node 365 is coupled to VTT_RX and sources current for receiver terminator 260 and transmitter terminator 250.

When AC coupling mode is commanded for receiver terminator 260, DC mode MOSFET 350 is turned off and AC mode MOSFETS 355 and 360 are turned on. Turning on the AC mode MOSFETS applies a voltage divider to node 365 using resistor 380 and resistor 385.

Receiver termination block 260 further supports the AC-coupled configuration in which transmitter 205 is connected via the pair of 10 nF capacitors 305 to receiver 210 rather than being DC connected by wires. In the AC-coupled configuration, capacitors 305 inhibit DC current from being sourced from receiver 210 across the channel and therefore when AC-coupling is used, transistor 350 is turned off. In AC-coupling mode, a common mode voltage of the signal presented to receiver 210 is established in receiver terminator 260. To accomplish this, the voltage divider of two resistor 380 and 385 is established between a receiver chip global power supply (VDD) and ground and the ratio of the resistors is chosen to establish the voltage at the common terminal of termination resistors 375 to be at an optimal value required by an amplifier input stage of receiver 210. The voltage divider is only desired in AC-coupled mode when transistor 350 is off, so to remove the voltage divider from the circuit when transistor 350 is on, transistor 355 and transistor 360 cut off the resistive paths between VDD and ground, effectively removing the voltage divider.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A serial communications system, comprising:

a transmitter for sending a serial data signal at an output of the transmitter;

a transmitter terminator, coupled to the output and responsive to a first external configuration signal for configuring the transmitter terminator to variably terminate a first selected property of the output;

a receiver for processing the serial data signal at an input of the receiver, the input of the receiver coupled to the output of the transmitter; and a receiver terminator, coupled to the input of the receiver and responsive to a second external configuration signal for configuring the receiver terminator to variably terminate a second selected property of the input.

2. The serial communications system of claim 1 wherein the configuration signals are provided under logic control.

3. The serial communications system of claim 1 wherein the first selected property and the second selected property are selected from the group comprising an AC/DC coupling mode, a termination voltage and a current sourcing mode.

4. The serial communications system of claim 1 wherein the transmitter is a differential mode driver and the serial data signal is a differential signal.

5. The serial communications system of claim 1 wherein the transmitter is implemented from a standardized transmitter core in an component library with the transmitter disposed on a first module and wherein the receiver is implemented from a standardized receiver core in the component library with the receiver disposed on a second module.

6. The serial communications system of claim 5 wherein the first module and the second module are coupled via a media type.

7. The serial communications system of claim 6 wherein the media type is a backplane connector.

8. The serial communications system of claim 6 wherein the media type is a cable connector.

9. A serial communications system, comprising:

a first serial link, including:

a first transmitter for sending a first serial data signal at a first output of the first transmitter;

a first transmitter terminator, coupled to the first output and responsive to a first external configuration signal for configuring the first transmitter terminator to variably terminate a first selected property of the first output;

a first receiver for processing the first serial data signal at a first input of the first receiver, the first input coupled to the first output; and a first receiver terminator, coupled to the first input of the receiver and responsive to a second external configuration signal for configuring the first receiver terminator to variably terminate a second selected property of the first input; and a second serial link, including:

a second transmitter for sending a second serial data signal at a second output of the second receiver;

a second transmitter terminator, coupled to the second output and responsive to a third external configuration signal for configuring the second transmitter terminator to variably terminate a third selected property of the second output;

a second receiver for processing the second serial data signal at a second input of the second receiver, the second input coupled to the second output; and a second receiver terminator, coupled to the second input of the second receiver and responsive to a fourth external configuration signal for configuring the second receiver terminator to variably terminate a fourth selected property of the second input.

10. The serial communications system of claim 9 wherein the selected properties are selected from the group comprising an AC/DC coupling mode, a termination voltage and a current sourcing mode.

11. The serial communications system of claim 9 wherein the transmitters are differential mode drivers and the serial data signals are differential signals.

12. The serial communications system of claim 9 wherein the transmitters are each implemented from a standardized transmitter core in an component library with the first transmitter disposed on a first module and the second transmitter disposed on a second module; wherein the receivers are implemented from a standardized receiver core in the component library with the first receiver disposed on third module and the second receiver disposed on a fourth module; wherein the transmitter terminators are implemented from a standardized transmitter terminator in the standardized library and disposed on the same module as their corresponding transmitters; and wherein the receiver transmitters are implemented from a standardized receiver terminator in the standardized library and disposed on the same module as their corresponding receivers.

13. The serial communications system of claim 12 wherein the first module and the third module are coupled via a first media type and wherein the second module and the fourth module are coupled via a second media type.

14. The serial communications system of claim 13 wherein the first transmitter terminator and the first receiver terminator are configured for the first media type and the second transmitter terminator and the second receiver terminator are for the second medium type, with the first transmitter terminator and the first receiver terminator configured differently from the second transmitter terminator and the second receiver terminator.

15. The serial communications system of claim 14 wherein the configuration signals are provided by logic control.

16. The serial communications system of claim 14 wherein the first medium type includes a backplane connection and wherein the second medium type includes a cable connection.

17. The serial communications system of claim 14 wherein the first medium type includes AC coupling and wherein the second medium type includes DC coupling.

18. A method for operating a serial communications system, comprising:

(a) providing a plurality of unidirectional serial links, each of the links between a transmitter and a receiver, an output of each transmitter coupled to an input of a corresponding receiver by a medium type with each output having a transmitter terminator and each input having a receiver terminator;

(b) terminating variably a selected property of the output of each transmitter to match the medium type coupling the output of each transmitter to the input of the corresponding receiver by use of an external transmitter termination configuration signal for configuring the transmitter terminator; and (c) terminating variably a selected property of the input of each receiver to match the medium type coupling the input of each receiver to the output of the corresponding transmitter by use of a receiver termination configuration signal for configuring the receiver terminator.

19. The operating method of claim 18 wherein each transmitter is implemented from a standardized transmitter core in an component library with the transmitters disposed on a one or more modules and wherein each receiver is implemented from a standardized receiver core in the component library with the receivers disposed on one or more modules different from the one or more modules having the transmitters.

* * * * *